United States Patent
Baker et al.

(10) Patent No.: US 9,688,574 B2
(45) Date of Patent: Jun. 27, 2017

(54) THERMOPLASTIC POLYURETHANES IN OPTICAL FIBER COATINGS

(75) Inventors: Linda S Baker, Addison, NY (US); Frederic Christian Wagner, Horseheads, NY (US)

(73) Assignee: Corning Incorporated, Corning, NY (US)

(*) Notice: Subject to any disclaimer, the term of this patent is extended or adjusted under 35 U.S.C. 154(b) by 1012 days.

(21) Appl. No.: 13/418,599

(22) Filed: Mar. 13, 2012

(65) Prior Publication Data

US 2013/0243948 A1  Sep. 19, 2013

(51) Int. Cl.
 *C03C 25/10* (2006.01)
 *C09D 4/06* (2006.01)
 *G02B 6/02* (2006.01)
 *C08F 290/06* (2006.01)

(52) U.S. Cl.
 CPC ...... *C03C 25/1065* (2013.01); *C08F 290/067* (2013.01); *C09D 4/06* (2013.01); *G02B 6/02395* (2013.01)

(58) Field of Classification Search
 USPC ............... 427/163.2, 140, 374.1, 374.4, 375
 See application file for complete search history.

(56) References Cited

U.S. PATENT DOCUMENTS

| 5,484,560 A * | 1/1996 | Moriyama et al. ........... 264/483 |
| 2003/0053782 A1* | 3/2003 | Fabian et al. ................ 385/128 |
| 2003/0095770 A1* | 5/2003 | Fewkes et al. ............... 385/128 |

FOREIGN PATENT DOCUMENTS

| WO | 0149793 A1 | 7/2001 |
| WO | 03011787 A2 | 2/2003 |

OTHER PUBLICATIONS

PCT International Search Report, Jun. 24, 2013.

* cited by examiner

*Primary Examiner* — Alex A Rolland
(74) *Attorney, Agent, or Firm* — Kevin L. Bray

(57) ABSTRACT

A process for correcting defects in a primary coating on a glass optical fiber involves providing an optical fiber configured for propagation of an optical signal, coating the optical fiber with a composition comprising a thermoplastic polyurethane and at least one acrylate monomer, curing the composition to form a relatively soft primary coating covering an outer surface of the optical fiber, the primary coating being a thermoplastic product of the polyurethane and the at least one acrylate monomer, coating the optical fiber with at least one relatively harder secondary coating layer disposed over the primary coating, heating the coated fiber to a temperature above the melting temperature of the thermoplastic product to cause the primary coating to flow and correct defects, and cooling the coated fiber to a temperature below the melting temperature of the thermoplastic product to provide a substantially defect free primary coating.

19 Claims, 3 Drawing Sheets

THERMOPLASTIC POLYURETHANES IN OPTICAL FIBER COATINGS

FIELD

This disclosure relates to the field of optical telecommunications equipment and more particularly to glass optical fibers having a relatively soft primary coating and a relatively harder secondary coating.

BACKGROUND

Optical fibers used in communications applications, such as in local area networks, telephone service, cable television service, and the like, involving the transmission of data, including digitally encoded voice and video communications data typically comprise a glass fiber that is provided with at least two protective coatings, including an inner or primary coating applied directly to the glass fiber and a secondary or outer coating applied over the primary coating.

The primary coating serves as a buffer to cushion and protect the glass fiber when the fiber is bent, cabled, or spooled. Stresses placed upon the optical fiber during handling may induce microbending of the fibers and cause attenuation of the light which is intended to be transmitted, resulting in inefficient signal transmission. The secondary coating is applied over the primary coating and functions as a tough, protective outer layer that prevents damage to the glass fiber during processing and use.

Between the two coatings, the inner, or primary coating has the strictest requirements for physical and chemical properties. These requirements include very low modulus, low glass transition temperature, and good adhesion to the glass. Because of these strict requirements, formulations used for preparing the inner or primary coating tend to be somewhat limited in terms of materials used, and also tend to be relatively expensive. In addition, a frequent problem with low modulus primary coatings is that they are prone to defects introduced by fiber processing and/or use in the field. These defects appear as rips in the coatings or delaminations from the glass, resulting in comprised fiber performance, e.g., significant undesirable attenuation.

SUMMARY

In certain embodiments, there is provided a process for correcting defects in a primary coating on a glass optical fiber, such as those defects introduced during fiber processing and/or use in the field. The process involves providing an optical fiber configured for propagation of an optical signal, coating the optical fiber with a composition comprising a thermoplastic polyurethane and at least one acrylate monomer, curing the composition to form a relatively soft primary coating covering an outer surface of the optical fiber, the primary coating being a thermoplastic product of the polyurethane and the at least one acrylate monomer, coating the optical fiber with at least one relatively harder secondary coating layer disposed over the primary coating, heating the coated fiber to a temperature above the melting temperature of the thermoplastic product to cause the primary coating to flow and correct defects, and cooling the coated fiber to a temperature below the melting temperature of the thermoplastic product to provide a substantially defect free primary coating.

In certain embodiments, the primary coating is prepared from a composition comprising a thermoplastic polyurethane and at least one acrylate monomer, wherein the at least one acrylate monomer is a solvating monomer such as phenoxyethyl acrylate.

In certain embodiments, the primary coating is prepared from a composition comprising a thermoplastic polyurethane and at least one acrylate monomer, wherein the ratio of thermoplastic polyurethane to acrylate monomer is from 1:99 to 50:50, such as from 3:97 to 20:80 or 8:92 to 15:85.

In other embodiments, the process involves preparing a primary coating from a composition comprising a thermoplastic polyurethane and at least one acrylate monomer, wherein the at least one acrylate monomer includes a fast curing mono functional acrylate monomer, such as an ethoxylated nonylphenol acrylate.

In certain embodiments, the process involves preparation of a primary coating from a composition comprising a thermoplastic polyurethane and at least one acrylate monomer, wherein the composition is free of high molecular weight functionalized polyurethane acrylate oligomer.

In certain embodiments, the process involves preparation of a primary coating from a composition comprising a thermoplastic polyurethane and at least one acrylate monomer, wherein the composition comprises less than 0.5% adhesion promoter by weight, such as a composition that is free of adhesion promoter.

In certain embodiments, the process involves preparation of a primary coating from a composition comprising a thermoplastic polyurethane and at least one acrylate monomer, wherein the cured composition has an elongation greater than 200%, such as greater than 250% or greater than or about equal to 265%.

In certain embodiments, the process involves preparation of a primary coating from a composition comprising a thermoplastic polyurethane and at least one acrylate monomer, wherein the cured composition has a Young's modulus of less than 1 MPa, such as less than 0.5 MPa, or less than or about equal to 0.3 MPa.

In certain embodiments, the process involves preparation of a primary coating from a composition comprising a thermoplastic polyurethane and at least one acrylate monomer, wherein the cured primary coating has a glass transition temperature of less than 10° C.

In accordance with certain embodiments, the coated fiber is heated to a temperature of from about 50° C. to 150° C. for a period from about 5 minutes to about 30 minutes to correct defects in the primary coating.

In certain embodiments, the process involves preparation of a primary coating from a coating composition comprising a thermoplastic polyurethane and at least one acrylate monomer, wherein the composition is essentially devoid of chemical cross linkers, whereby the cured composition remains thermoplastic, thereby facilitating thermal healing, such as by heating the coated fiber for a period of time and a temperature sufficient to correct defects in the primary coating.

DETAILED DESCRIPTION

It has been discovered that certain optical fiber coating compositions, such as those disclosed in U.S. Patent Application Publication No. 2003/0095770, have self healing properties, i.e. the ability to repair defects in the coating through thermal manipulation of virtual cross links. In particular, it has been discovered that such primary coating formulations can be subjected to a post cure thermal treatment that renders the primary coating essentially free of defects.

The compositions used for preparing the primary coatings of the various embodiments described herein are substantially free of cross linkers and chemical cross links. Rather, the compositions provide virtual cross links that make it possible to heal the coating defects by application of heat. The virtual cross links involve hydrogen bonding and/or other non-covalent and/or non-ionic bonding after curing and solidification, with the resulting cured composition being a thermoplastic material that can be reheated, melted or caused to reflow, and be reshaped to facilitate self-healing and correction of coating defects. Thus, the primary coatings disclosed herein are substantially free of covalent cross links that would render the composition thermoset and incapable of being reshaped by thermal treatment.

In addition to the very desirable property of being able to thermally treat primary coatings prepared from the compositions disclosed herein to correct production or field handling defects, the primary coating compositions contain low concentrations of thermoplastic polyurethanes, replacing the high concentrations of the expensive urethane acrylate oligomers that are typically used. The disclosed primary coating compositions also exhibit excellent adhesive properties without, or with a reduced need for, the addition of expensive silane based adhesion promoters. In addition to exhibiting excellent adhesion, a thermal healing property, and lower cost, the primary coating compositions disclosed herein also exhibit adequate to excellent low modulus, low glass transition temperature and other desired physical and chemical properties for use as a primary coating on an optical fiber.

It is anticipated that use of a post cure thermal treatment will substantially eliminate coating defects introduced during production and thereby substantially eliminate product returns based on unacceptable signal attenuation due to primary coating defects.

Figure 1:
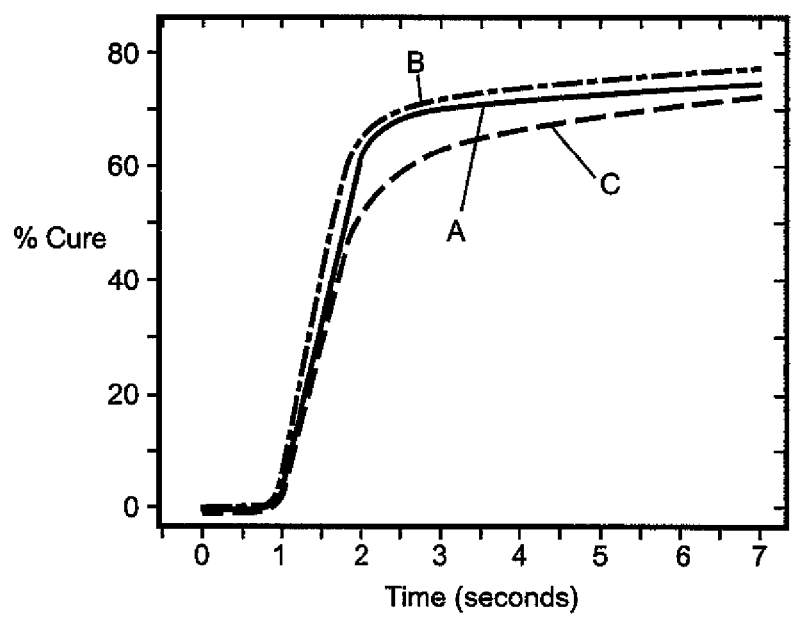
FIG. 1 is a graphical comparison of the cure speed of a primary coating composition in accordance with an embodiment disclosed herein with the cure speed of known primary coatings used in commercially marketed optical fiber products.

As shown in FIG. 1, the cure speed (percentage of cure as a function of time) for a primary coating composition as disclosed herein (curve A) is substantially the same as a popular commercially employed primary coating composition (curve B), and somewhat better than another popular commercially employed primary coating composition (curve C). Cure speed is a measurement of completion of acrylate polymerization, and can be used to measure the feasibility of being able to successfully apply a primary coating to an optical fiber during a draw process employed during high speed production of optical fiber products. Cure percentage refers to the percentage of acrylate functional groups that have been reacted in the formulation.

Figure 6:
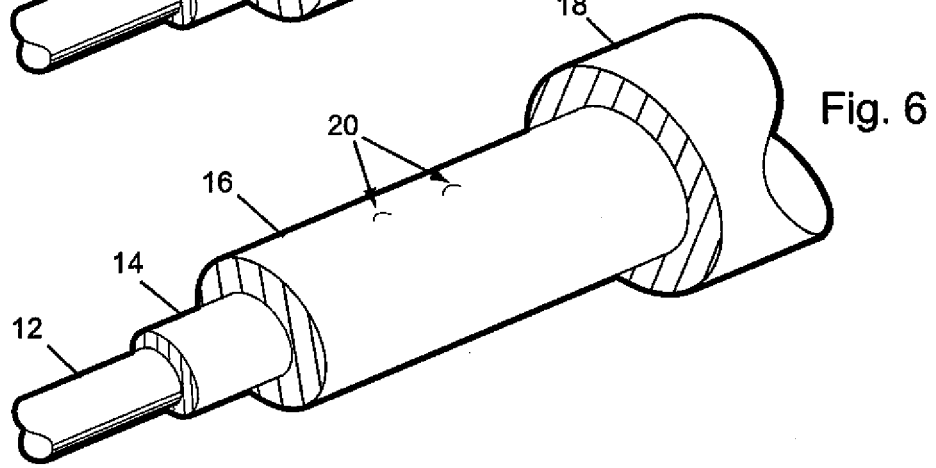
Figure 7:
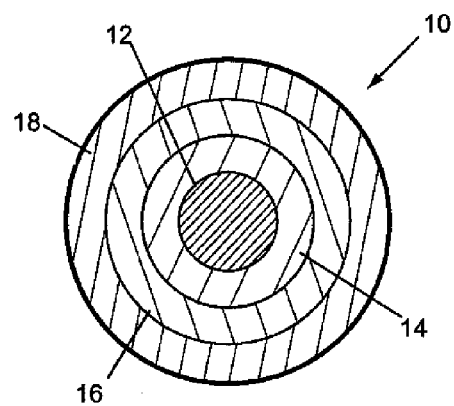
FIG. 7 is a schematic cross-section of a typical coated optical fiber product.

A first step in the disclosed processes for correcting defects in a primary coating on a glass optical fiber is to provide a glass fiber that is capable of propagating an optical signal over a long distance with minimal loss of signal. A typical optical fiber is illustrated in FIG. 6. The optical fiber includes a glass core 12 and a glass cladding 14. Applied over glass cladding layer 14 is the primary coating layer 16. At least one outer or secondary coating layer 18 is applied over the primary coating layer 16. Polymerization or curing of the primary coating can occur either before or after application of the secondary coating.

The core and cladding layer are typically produced in a single operation by methods which are well known in the art. Suitable methods include the double crucible method as described, for example, in Mid-Winter, Optical Fibers for Transmission New York, John Wiley, pages 166-178 (1979); rod-in-tube procedures; and doped deposited silica processes, also commonly referred to as chemical vapor deposition (CVD) or vapor phase oxidation. A variety of chemical vapor deposition processes are known and are suitable for producing the core and cladding layer used in the optical fibers disclosed herein. They include external chemical vapor deposition processes; axial vapor deposition processes; and modified chemical vapor deposition, which is also known as inside vapor deposition.

The glass optical fiber does not necessarily require a core and cladding arrangement, but may be comprised of different structures that facilitate propagation of an optical signal, such as optical fibers that have a structure that relies on a phenomenon that is the optical analog of the quantum phenomenon known as Anderson localization or strong localization.

The primary and secondary coating compositions are coated onto the glass optical fiber using conventional processes. It is well known to draw a glass fiber from a specially prepared, cylindrical glass preform heated to a temperature such as about 2000° C. As the preform is heated, such as by feeding the preform into and through a furnace, a glass fiber is drawn from the molten material. The primary and secondary coating compositions are applied to the glass fiber after it has been drawn from the preform, preferably immediately after cooling. The coating compositions are then cured to produce the coated optical fiber. The method of curing can be thermal, chemical, or radiation induced, such as by exposing the un-cured coating composition on the glass fiber to ultraviolet light or an electron beam, depending upon the nature of the coating composition and polymerization system being employed. It is frequently advantageous to apply both the primary coating composition and any secondary coating composition in sequence following the draw process. One method of applying dual layers of coating compositions to a moving glass fiber is disclosed in U.S. Pat. No. 4,474,830 to Taylor. Alternatively, the primary coating composition can be applied and cured to form the primary coating material 16, and thereafter, the secondary coating composition can be applied and cured to form the secondary coating material 18.

The thermoplastic polyurethane materials that may be employed in the primary coating compositions disclosed herein are a class of polyurethane plastics which exhibit elastomeric properties and consist of linear segmented block copolymers composed of hard and soft segments. Thermoplastic polyurethanes are formed by the reaction of diisocyanates with short-chain diols, and diisocyanates with long-chain bifunctional diols. The final resin consists of linear polymeric chains and block-structures. The chains include low polarity segments which are relatively long, and which are referred to as the soft segments, alternating with shorter, higher polarity segments, which are the relatively hard segments. These segments are linked together by covalent bonds to form block copolymers. The polarity of the hard segments creates the strong attraction between them which causes a high degree of aggregation of order in this space, forming crystalline or pseudo-crystalline areas located in a soft and flexible matrix. This aggregating effect provides pseudo cross links which break down upon application of sufficient thermal energy, facilitating reshaping, if desired.

Thermoplastic polyurethanes suitable for use in the embodiments disclosed herein are commercially available under various tradenames and trademarks such as: ELASTOLLAN® thermoplastic polyurethane which is available from BASF and Elastogran, PEARLTHANE® thermoplastic polyurethane available from Merquinsa, DESMOPAN® thermoplastic polyurethane available from Bayer, ESTANE® thermoplastic polyurethane available from Lubrizol, PELLETHANE® thermoplastic polyurethane available from Lubrizol, IROGRAN® thermoplastic polyurethane available from Huntsman, EXELAST®EC thermoplastic polyurethane available from Shin-Etsu polymer Europe B.V., LARIPUR® thermoplastic polyurethane available from COIM-SpA, AVALON® thermoplastic polyurethane available from Huntsman, and ISOTHANE® thermoplastic polyurethane available from Greco.

Previously known primary coating formulations typically incorporate greater than 50% urethane-acrylate oligomer by weight and about 1% silane based adhesion promoter by weight. The primary coating formulations of this disclosure replace the urethane-acrylate oligomer with a mixture of thermoplastic polyurethane (TPU) and a monofunctional acrylate monomer such as phenoxyethyl acrylate (SR339) at a ratio of 10:90. The resulting mixture has a viscosity close to that of a typical high molecular weight urethane-acrylate oligomer. The primary coating formulations may further comprise a fast curing monofunctional acrylate monomer, such as an ethoxylated nonylphenol acrylate (SR504), a photoinitiator and an antioxidant.

Examples of suitable acrylate monomers include lauryl acrylate (e.g., SR335 available from Sartomer company), ethoxylated nonylphenol acrylate (e.g., SR504 available from Sartomer company), caprolactone acrylate (e.g., SR495 available from Sartomer company), phenoxyethyl acrylate (e.g., SR339 available from Sartomer company), isooctyl acrylate (e.g., SR440 available from Sartomer company), tridecyl acrylate (e.g., SR489 available from Sartomer company), phenoxyglycidyl acrylate (e.g., CN131 available from Sartomer company), lauryloxyglycidyl acrylate (e.g., CN130 available from Sartomer company), isobornyl acrylate (e.g., SR506 available from Sartomer company), tetrahydrofuryl acrylate (e.g., SR285 available from Sartomer company), stearyl acrylate (e.g., SR257 available from Sartomer company), isodesyl acrylate (e.g., SR257 available from Sartomer company), isodecyl acrylate (e.g., SR395 available from Sartomer company), and combinations thereof. In certain embodiments, the acrylate monomer is a solvating monomer, meaning that the selected thermoplastic polyurethane is soluble in the monomer, at least in the proportions used.

Suitable photoinitiators include 1-hydroxycyclohexyl phenyl ketone (e.g., irgacure 184 available from Ciba Specialty Chemical), (2,6-dimethoxyeenzoyl)-2,4,4-trimethylpentyl phosphine oxide (e.g., blends of irgacure 1800, 1850 and 1700 available from Ciba Specialty Chemical), 2,2-dimethoxyl-2-phenyl acetophenone (e.g., irgacure 651, available from Ciba Specialty Chemical), this (2,4,6-trimethyl benzoyl)phenyl-phosphine oxide (e.g., irgacure 819), (2,4,6-trimethyl benzoyl)diphenyl phosphine oxide (Lucerin TPO, available from BASF, Munich, Germany), ethoxy(2, 4,6-trimethyl benzoyl)phenyl phosphine oxide (Lucerin TPO-L from BASF, and combinations thereof.

A suitable antioxidant, if desired, is thiodiethylene bis(3, 5-di-tert-butyl)-4-hydroxyhydrocinnanate) (e.g., irganox 1035, available from Ciba Specialty Chemical).

Other additives, such as tackifiers, catalysts, lubricants, stabilizers, etc., may be employed as desired, provided they do not adversely affect thermal healing or primary coating properties to an undesirable extent.

A comparison of a conventional primary coating formulation with a formulation in accordance with the embodiments disclosed herein is shown in the following Table 1.

TABLE 1

| Component | basic primary formulation | Inventive formulation |
| --- | --- | --- |
| fast cure monofunctional acrylate monomer SR504 | 45% | 36% |
| high Mw functionalized urethane acrylate oligomer | 52% | 0% |
| diluent monofunctional acrylate monomer SR339 | 0% | 54% |
| thermoplastic urethane | 0% | 6% |
| adhesion promoter | 1% | 0% |
| antioxidant | 1% | 1% |
| photoinitiator | 3% | 3% |

Typical physical property requirements for primary coatings include an elongation of greater than 100%, and a Young's modulus of less than 1 MPa. The formulations disclosed herein exhibit properties well within these requirements, such as a Young's modulus of about 0.3 or less, and an elongation of about 265% or more. Measured cure speeds were comparable to primary coatings currently used in production (see FIG. 1).

Figure 2:
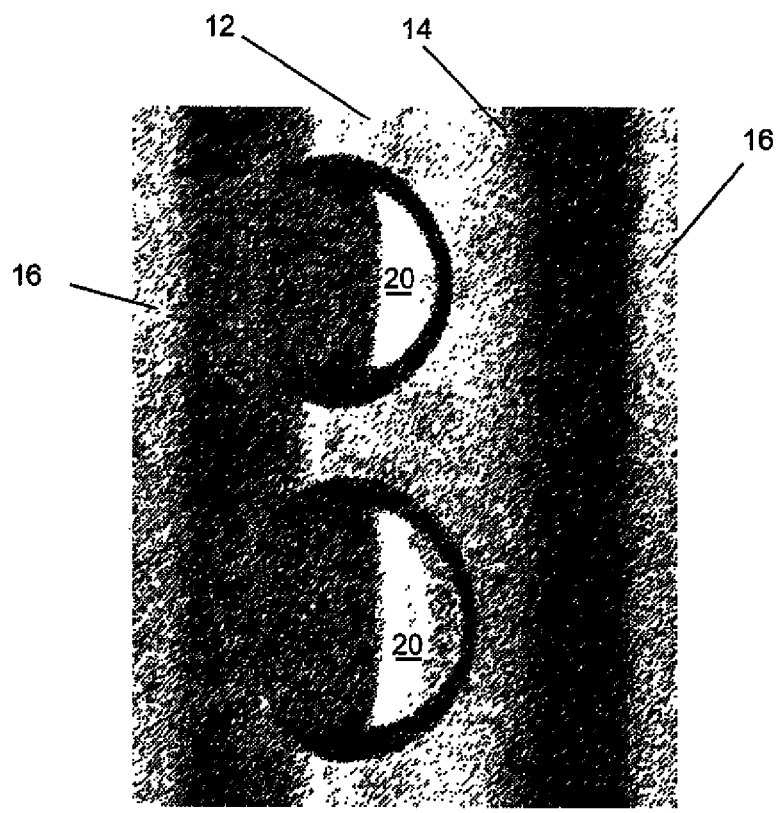
FIG. 2 is an optical micrograph of a coated optical fiber having induced defects in the primary coating.
Figure 3:
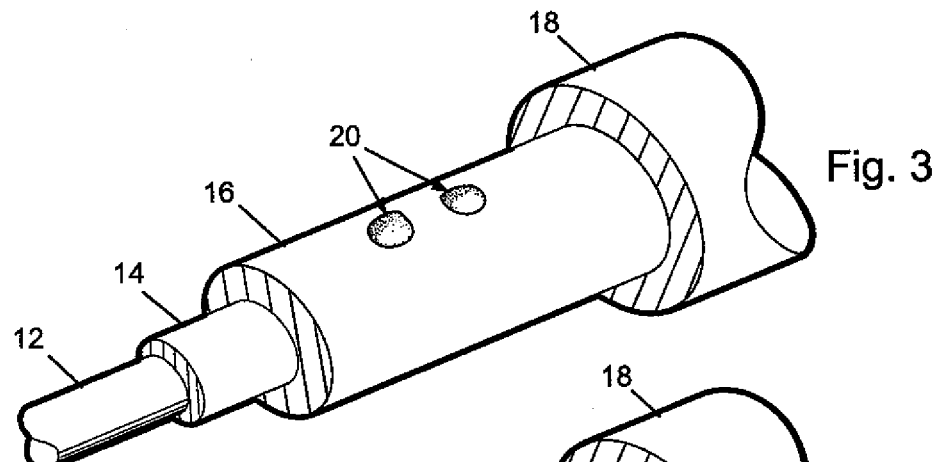
FIGS. 3-6 are perspective views of a coated optical fiber with portions broken away to illustrate the disappearance or self healing of draw induced primary coating defects during a heating step in accordance with the disclosed process.
Figure 4:
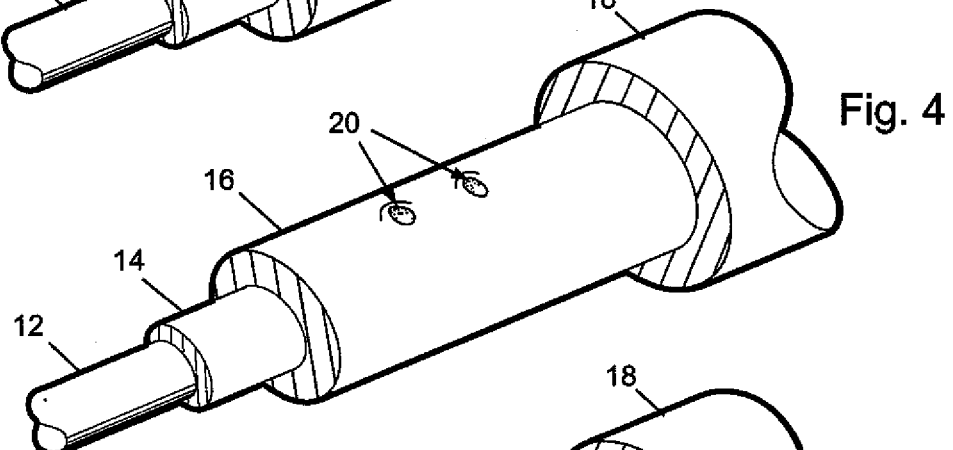
Figure 5:
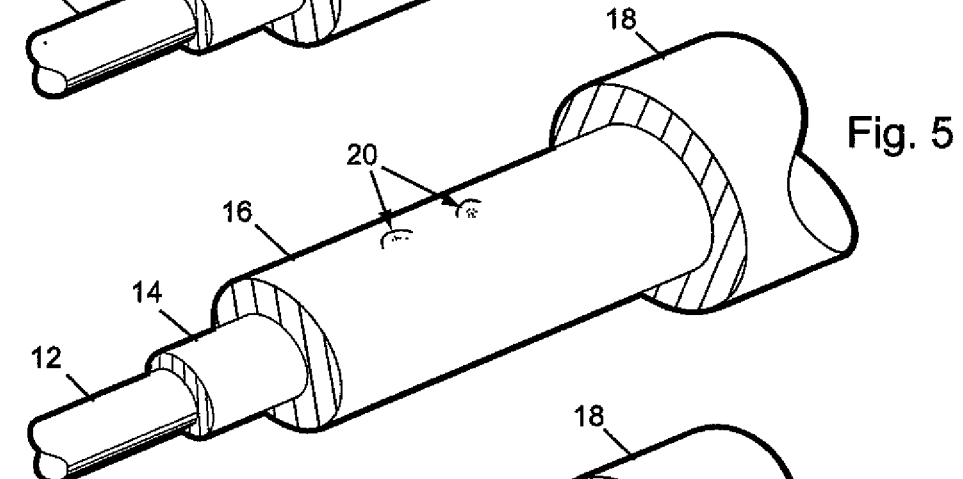
Figure 8:
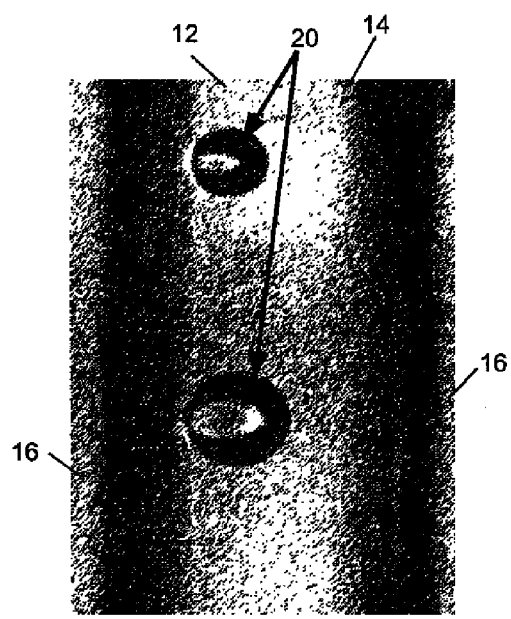
FIGS. 8-10 are optical micrographs showing the actual healing illustrated in FIGS. 4-6.
Figure 9:
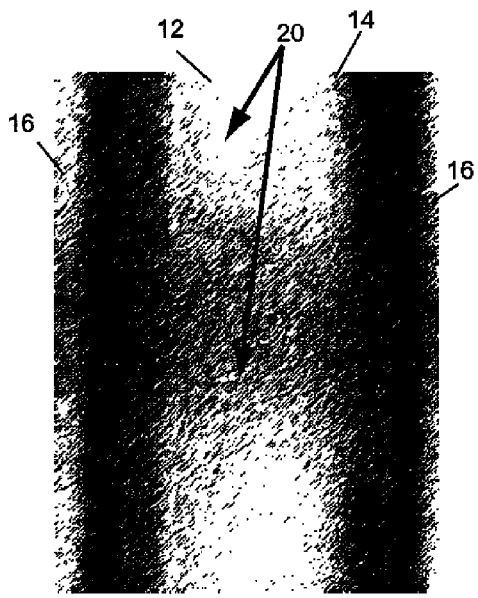
Figure 10:
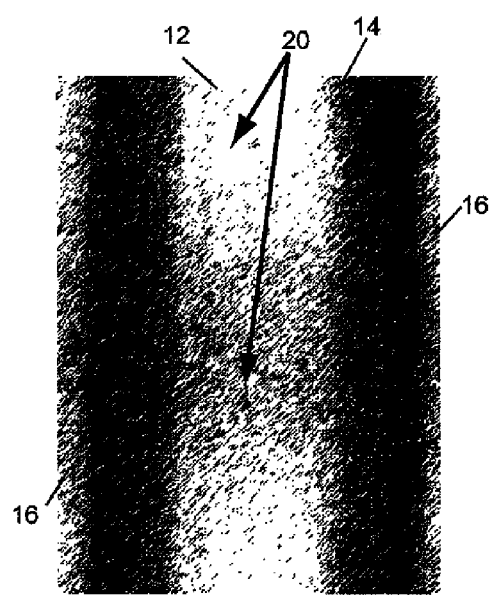

The self-curing properties of the primary coating formulations disclosed herein are illustrated in FIGS. 2-5. Because thermoplastic polyurethanes contain both hard and soft segments, the hard segments are capable of associating through hydrogen bonds forming virtual cross links Due to the fact that all reactive monomers used in the formulation are monofunctional and do not form covalent cross links, the virtual cross links are essentially the only cross links in the coating network. These hydrogen bonds break down at elevated temperatures causing the coating to become more liquid. This enables the coating to flow, filling in voids and defects in the primary coating. The virtual cross links then reassociate upon cooling and the coating is restored to its original properties. It is this process that allows the repair of coating defects introduced during production and/or use of the fiber. FIG. 2 is a photomicrograph of a coated optical fiber in accordance with the embodiments disclosed herein where primary coating defects 20 were induced during production. Production techniques were deliberately adjusted to produce defects 20 that are considerably larger than those occurring during normal production in order to illustrate the effectiveness of the processes disclosed herein. The induced defects are the two fairly large circular regions near the left edge of the fiber (the light band between the two darker bands in the field of view). FIGS. 3-6 are drawings schematically illustrating the thermal healing process. The actual micrographs corresponding to FIGS. 3-6 are shown in FIGS. 8-10. As shown in FIG. 3, after 15 minutes at 100° C., the defects are substantially smaller. As shown in FIG. 4, after 5 hours at 100° C., the defects are completely eliminated leaving only minimal scaring. As shown in FIG. 5, 17 hours after the thermal repair has been effected, the repair appears to be irreversible and permanent.

The thermal healing step may be performed in the field after handling if unacceptably high attenuation is detected, and/or as a post-cure step during production of optical fiber product.

The described embodiments are preferred and/or illustrated, but are not limiting. Various modifications are considered within the purview and scope of the appended claims.

What is claimed is:

1. A process for correcting defects in a primary coating on a glass optical fiber comprising:
   (a) providing an optical fiber configured for propagation of an optical signal;
   (b) coating the optical fiber with a composition comprising a thermoplastic polyurethane and at least one acrylate monomer;
   (c) curing the composition to form a primary coating covering an outer surface of the optical fiber, the primary coating comprising a thermoplastic product of the polyurethane and the at least one acrylate monomer;
   (d) coating the optical fiber with at least one secondary coating layer disposed over the primary coating;
   (e) heating the coated fiber to a temperature above the melting temperature of the thermoplastic product to cause the primary coating to flow and correct defects; and
   (f) cooling the coated fiber to a temperature below the melting temperature of the thermoplastic product to provide a substantially defect free primary coating.

2. The process of claim 1, wherein the acrylate monomer is a solvating monomer.

3. The process of claim 1, wherein the ratio of thermoplastic polyurethane to acrylate monomer is from 1:99 to 50:50.

4. The process of claim 1, wherein the ratio of thermoplastic polyurethane to acrylate monomer is from 3:97 to 20:80.

5. The process of claim 1, wherein the ratio of thermoplastic polyurethane to acrylate monomer is from 8:92 to 15:85.

6. The process of claim 1, wherein the at least one acrylate monomer includes a fast curing monofunctional acrylate monomer.

7. The process of claim 6, wherein the fast curing monofunctional acrylate monomer is an ethoxylated nonylphenol acrylate.

8. The process of claim 1, wherein the composition is free of high molecular weight functionalized polyurethane acrylate oligomer.

9. The process of claim 1, wherein the composition comprises less than 0.5 percent adhesion promoter by weight.

10. The process of claim 1, wherein the composition is free of adhesion promoter.

11. The process of claim 1, wherein the cured composition has an elongation greater than 200%.

12. The process of claim 1, wherein the cured composition has an elongation greater than 250%.

13. The process of claim 1, wherein the cured composition has an elongation of greater than or equal to 265%.

14. The process of claim 1, wherein the cured composition has a Young's modulus of less than 1 MPa.

15. The process of claim 1, wherein the cured composition has a Young's modulus of less than 0.5 MPa.

16. The process of claim 1, wherein the cured composition has a Young's modulus of less than or about equal to 0.3 MPa.

17. The process of claim 1, wherein the cured primary coating has a glass transition temperature of less than 10° C.

18. The process of claim 1, wherein the coated fiber is heated to a temperature of from about 50° C. to 150° C. for a period of from about 5 minutes to about 30 minutes to correct defects in the primary coating.

19. The process of claim 1, wherein the composition is essentially devoid of chemical crosslinkers, whereby the cured composition remains thermoplastic, facilitating thermal self healing.

* * * * *